(12) United States Patent
Bennington, II et al.

(10) Patent No.: US 6,871,757 B2
(45) Date of Patent: Mar. 29, 2005

(54) METHOD AND MEANS FOR SAND REBLENDING

(75) Inventors: William J. Bennington, II, Columbus, NE (US); Franklin E Squires, Des Moines, IA (US)

(73) Assignee: Greystone, Inc., Columbus, NE (US)

(*) Notice: Subject to any disclaimer, the term of this patent is extended or adjusted under 35 U.S.C. 154(b) by 191 days.

(21) Appl. No.: 10/336,494

(22) Filed: Jan. 3, 2003

(65) Prior Publication Data

US 2004/0144797 A1 Jul. 29, 2004

(51) Int. Cl.⁷ ................................................ B67B 7/00
(52) U.S. Cl. ........................ 222/1; 222/52; 222/144.5; 222/644; 209/491

(58) Field of Search ............................... 222/1, 23, 30, 222/52, 64, 129, 132–135, 144.5, 145.1, 145.5, 145.6, 644; 209/488, 491, 464, 483

(56) References Cited

U.S. PATENT DOCUMENTS

| | | | | |
|---|---|---|---|---|
| 3,913,788 A | * | 10/1975 | McCauley | 222/64 |
| 3,959,636 A | * | 5/1976 | Johnson et al. | 700/84 |
| 4,428,505 A | * | 1/1984 | Casey et al. | 222/64 |
| 5,818,732 A | * | 10/1998 | Vanderwilt | 702/128 |
| 6,311,847 B1 | | 11/2001 | Soldwish-Zoole et al. | |
| 6,447,674 B1 | * | 9/2002 | Simon et al. | 210/104 |

* cited by examiner

Primary Examiner—Frederick Nicolas

(57) ABSTRACT

A method and apparatus for reblending sand whereby multiple reblending tanks with a plurality of reblending stations have thin respective outputs joined through a single control system.

10 Claims, 5 Drawing Sheets

METHOD AND MEANS FOR SAND REBLENDING

BACKGROUND OF THE INVENTION

U.S. Pat. No. 6,311,847 discloses a method and means for sand reblending using a single tank for receiving aggregate of various sizes for classification. The tank has a plurality of stations with primary and secondary discharge valves. The tank is then calibrated to determine raw feed analysis, discharge rates and the flow multipliers needed to develop a mathematical model of the tank. Inputting the calibration information data and the desired production specification into a computer allows the tank to be operated and controlled with appropriate adjustments in discharge rates and valve percent settings at each station. The apparatus for this method includes the tank, a pumping device, and a computer interconnected with a PLC and electrohydraulic mechanisms for valves at each tank station such that both the discharge rate from each station and the valve percent settings of the individual valves at each station are variable and controllable.

It is common in sand reblending to use two or more classification tanks. Currently the available systems for controlling multiple classifying tanks are to use multiple controls. These separate controls blend a specification material and then the two materials are mechanically blended into one presumably specification product. This is a good assumption as long as the material being fed to the tanks is the same. If this material is dissimilar either due to mechanical means or is from different sources then the efficiency of the twin tanks can be severely impaired and it is theoretically possible that a combined product will be out of specification. Finally, control of the fineness modulus (another type of specification designed to make the output of a plant consistent from day to day) is problematic and would require human oversight.

It is therefore an object of the invention to provide a method and means for sand reblending wherein multiple tanks operate in accordance with the process of U.S. Pat. No. 6,311,847 but are controlled by a single controller so that the tanks act concurrently and in unison as if they were one large tank.

A further object of the invention is to provide a method and means for sand reblending which improves the efficiency of the tanks and wherein shortages in one tank may be offset by excesses in the other.

These and other objects will be apparent to those skilled in the art.

SUMMARY OF THE INVENTION

This invention is an improvement of U.S. Pat. No. 6,311, 847, which is incorporated herein in its entirety. The essence of the improvement is the controlling of a multi-tank blending system with a single controller rather than separate controllers so that the tanks can operate in unison rather than independently whereby more accuracy and efficiency is achieved in the blending operation.

The method of reblending aggregate according to this invention includes delivering aggregate of various sizes to classification tanks having a plurality of stations with primary and secondary discharge valves. The tanks are then calibrated to determine raw feed analysis, discharge rates and the flow multipliers needed to develop a mathematical model of the tanks. Inputting the calibration information data and the desired production specification into a computer allow the tanks to be operated and controlled with appropriate adjustments in discharge rates and valve percent settings at each station. The apparatus for this method includes the tanks, a pumping device, and a single computer interconnected with a controller and electrohydraulic mechanism for valves at each tank station such that both the discharge rate from each station and the valve percent settings of the individual valves at each station are variable and controllable.

DESCRIPTION OF THE PREFERRED EMBODIMENT

Figure 1:
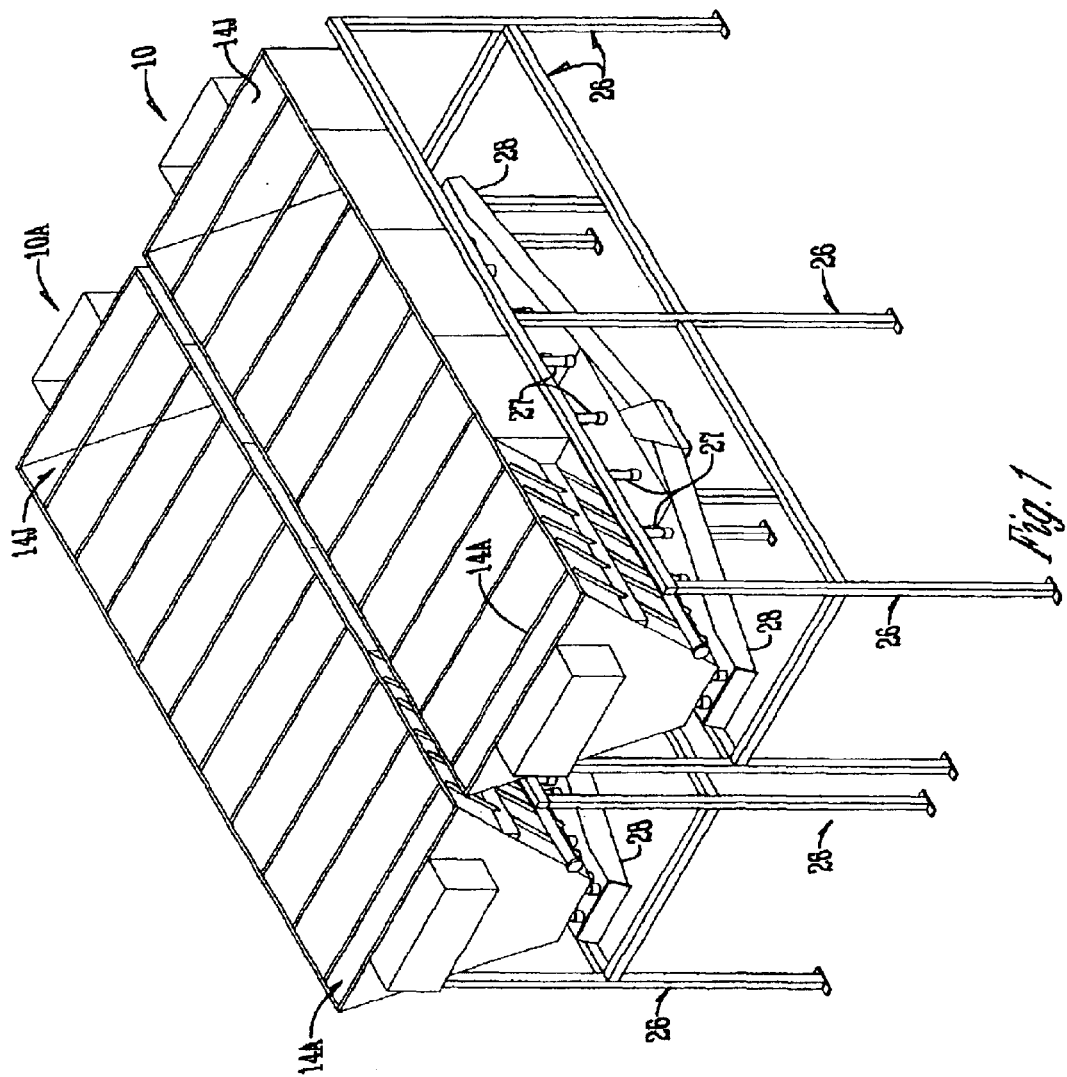
FIG. 1 is a perspective view of the device of this invention.

The hydraulic classification tanks 10 and 10A shown in FIG. 1 facilitates the use of the control 12 (FIG. 5) and methods of this invention. The controls and methods of this invention utilize a personal computer to track the product discharged, perform the mathematical optimization routines, and determine new valve settings for each station 14A–J located on each tank 10 and 10A.

Figure 5:
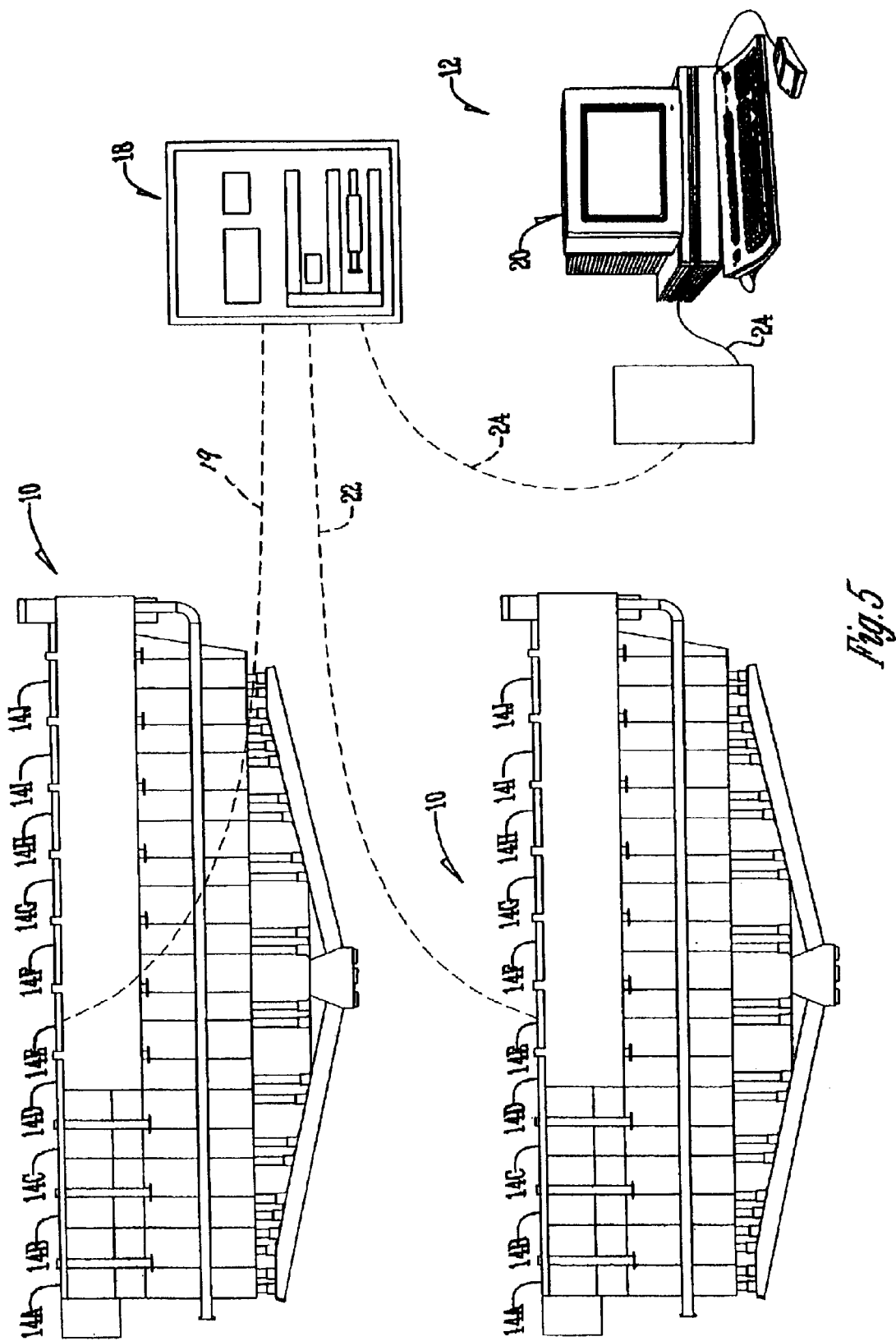
FIG. 5 is a schematic diagram showing the control for reblending fine aggregate utilizing the dual tanks shown in the previous figures.

Referring to FIG. 5, the control 12 includes a controller 18 in communication with each of the stations 14A–J (one PLC module may share several stations), and the PLC 18 is in communication via cable with and controlled in a closed loop by a personal desktop computer 20. The tanks 10 and 10A are operatively connected to the controller 18 by suitable cables 20 and 22, respectively. Cable 24 connects controller 18 to computer 20. The control components 18 and 20 simulate the control components of U.S. Pat. No. 6,311,847. Only one set of control components, however, control both tanks 10 and 10A simultaneously.

Figure 2:
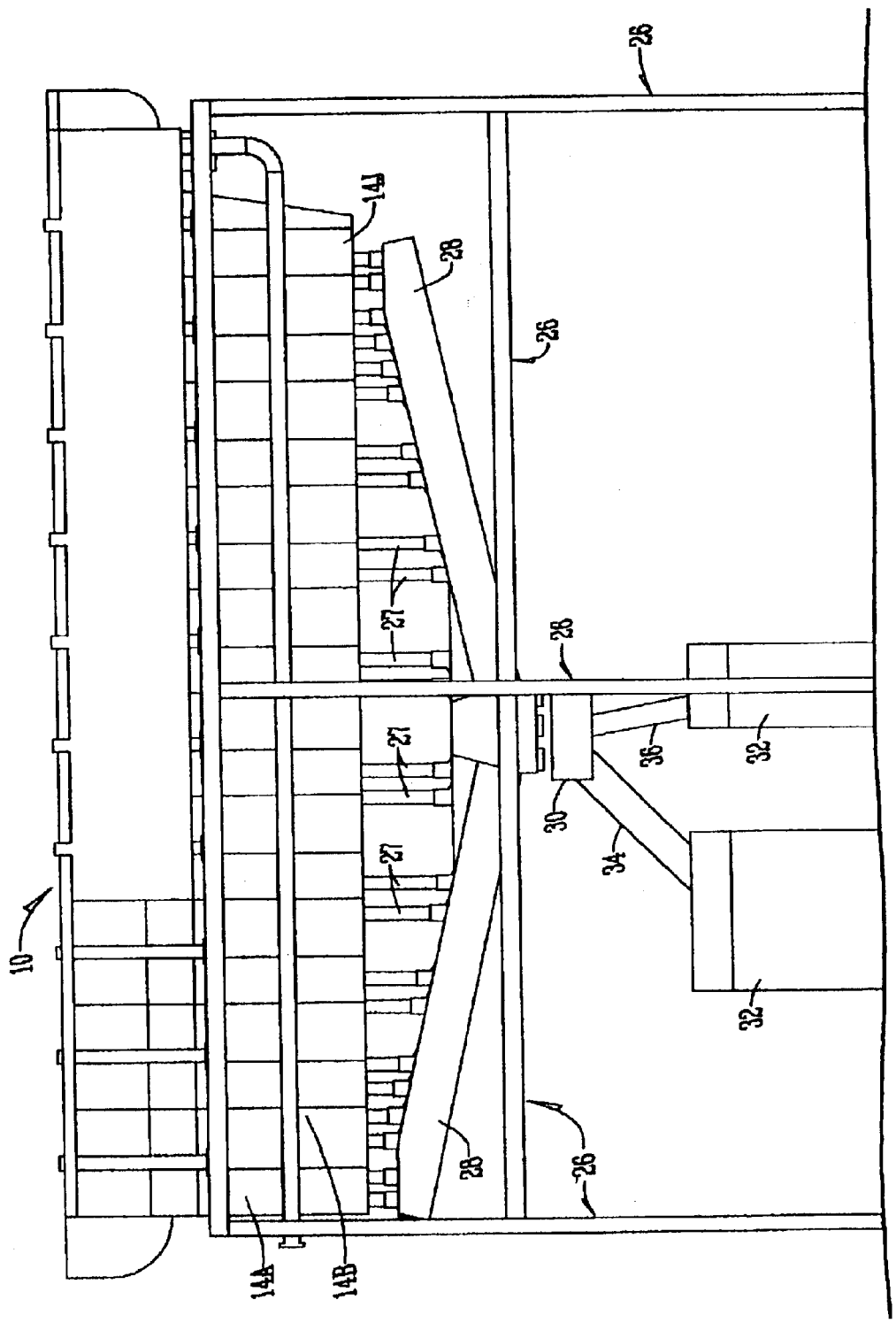
FIG. 2 is a front elevational view thereof.
Figure 3:
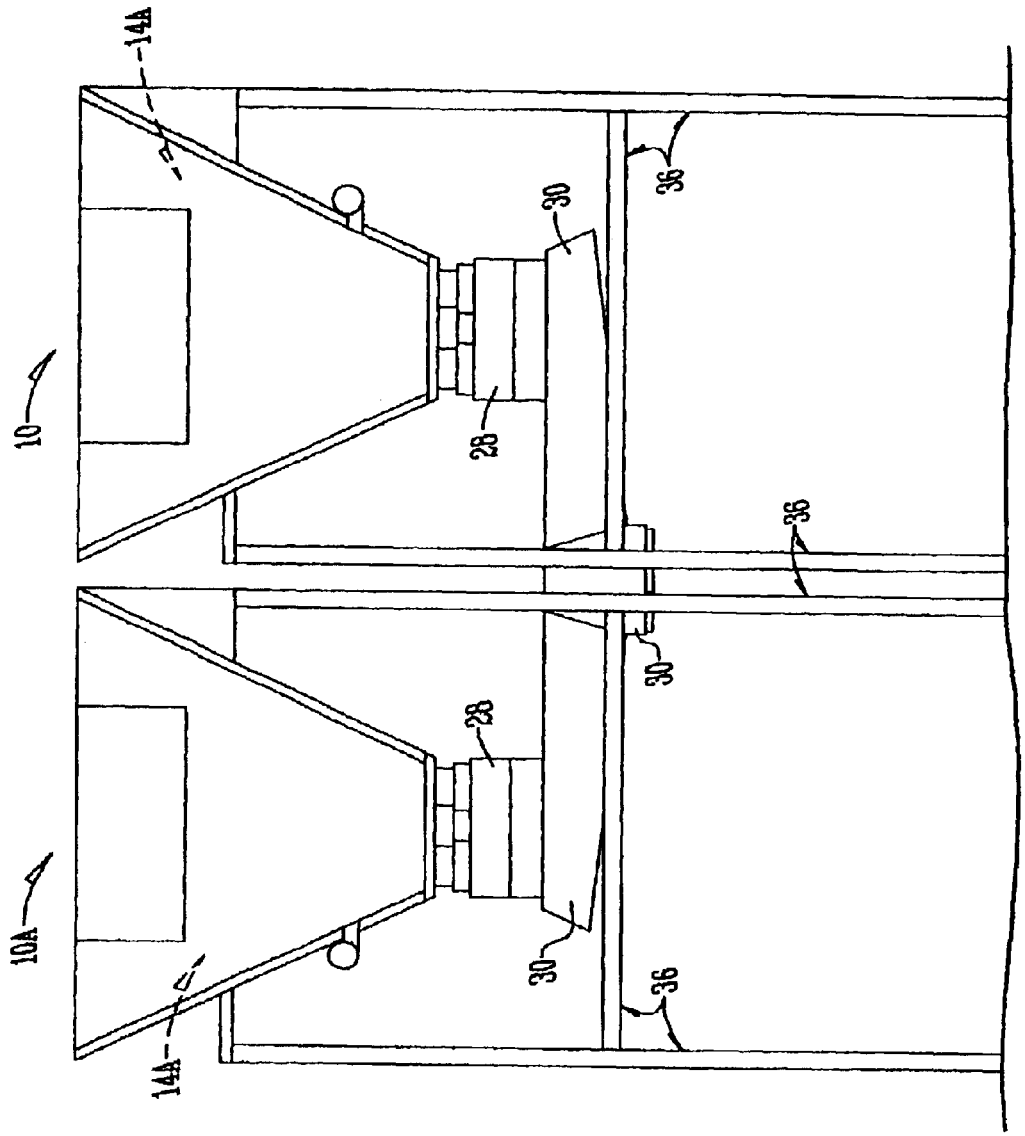
FIG. 3 is an end elevational view thereof as seen from the left-hand end of FIG. 1.
Figure 4:
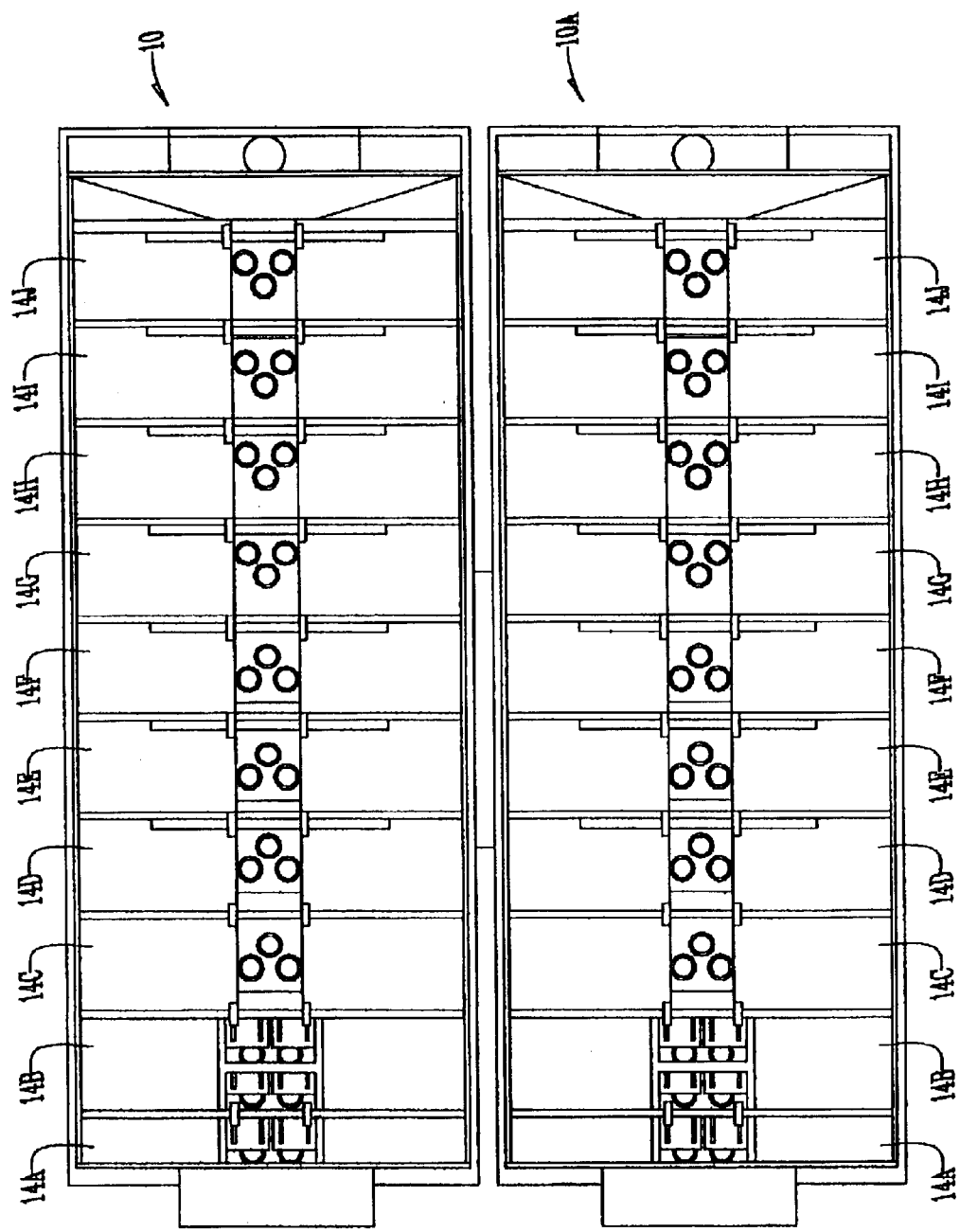
FIG. 4 is a top plan view thereof.

Tanks 10 and 10A are substantially identical and are supported in an elevated condition by framework 26. Each tank 10 and 10A has a discharge flume 28 which receive the discharged material through tank discharge pipes 27 from the stations 14A–14J on each tank. The flumes 28 each discharge into a common trough 30 where they are then conveyed to one or more dewatering devices 32 (shown only in FIG. 2) by conduits 34 and 36. Again, each tank operates as described in the U.S. Pat. No. 6,311,847 patent, except that the controls 12 treat the two tanks as one.

The advantages of this arrangement is that separate controls do not have to be made available for both tanks. However, and more importantly, the single control system takes advantage of the possibility for one math model to simulate the two tanks as if they were just one tank. It allows for the coarseness of the material to blend so that if one tank produces a mix toward the lower parameter of the material specifications, and the other tank produces a mix toward the higher parameter of the material specifications, the resulting blended material outputs will provide a resulting coarseness factor ("FM", or "fineness modulus") well within the parameters of the material specifications. Without the tanks operating together under one control system, this advantage would not exist.

More than two tanks could be successfully used for this system. Thus, from the foregoing, it is seen that this invention will achieve at least all of its stated objectives.

What is claimed is:

1. A method of reblending a mixture of aggregates, comprising, providing classification tanks with a plurality of stations to receive a raw feed input slurry comprising fluid and a mixture of aggregates of a plurality of mesh sizes, each station having at least a primary product discharge valve and a waste product discharge valve;

providing a single computer connected to the primary product discharge valve, the waste product discharge valve, and a bed level sensor at each station which must be tripped for the primary product discharge valve and waste discharge valve to be opened;

inputting into the computer an initial data set for startup including an initial Station Analysis matrix and initial discharge flow rates;

calibrating the tanks and computer for the given location by setting the primary product discharge valve at each station open 100%, delivering the input slurry to the tank, running the tank for a given calibration cycle time, sampling and sieve testing aggregate from the given location to approximate the distribution of mesh sizes contained in the input slurry, sampling and sieve testing aggregate discharged by the tanks at each station respectively, and inputting the test results into the computer so as to develop a mathematical model of the tank including an initial Product A array, a Calibrated Station Analysis Matrix of actual tank performance in terms of individual percent retained for each mesh size at each station, and a matrix of discharge flow rate multipliers that reconciles the input slurry with the sampled aggregate discharged by the tank during calibration;

inputting into the computer predetermined content specifications for a primary product including high and low percentages of aggregates capable of passing through a given series of progressively smaller mesh sizes;

simulating in the computer that the tanks have been run in a production mode for a given cycle time;

comparing the simulated output gradation of the tanks with the predetermined content specifications and identifying any variances therefrom;

determining which of the variances are the greatest and which of the mesh sizes is associated therewith;

progressively and sequentially searching through each station in the Product A array to identify a marker station that would first reduce said greatest variance if the primary product discharge valve associated with the station were closed a portion of the given cycle time;

searching the Calibrated Station Analysis Matrix, beginning at the marker station and continuing through all subsequent stations to find a station having the highest percent retained value for the next smaller mesh size than the mesh size with the greatest variance;

simulating setting the primary product discharge valve to be open a lower percentage of the given cycle time at the station having the highest percent retained value from the previous step;

calculating a revised Product A Matrix and replacing the raw input feed with a projected resultant gradation output by the tank based upon the previous step;

repeating the foregoing simulation and searching steps for any other mesh sizes which exhibit nonzero variance values, so that all variations from the content specifications have been considered and eliminated if possible;

establishing target percent open time settings for the primary product discharge valves at each station for a production cycle based upon the above simulations and calculations;

running the tanks in a production mode for a production cycle time using the target percent open settings for the valves as determined by the most recent computer simulations and calculations;

monitoring and recording the actual open times of the primary product discharge valves allowed by the bed level sensors during the production cycle time and relaying said information to the computer;

recalculating the flow discharge rates, the raw feed input, and the variances based upon the actual valve open times recorded; and repeating the foregoing steps before a next production cycle as needed to keep the resultant gradation of the primary product in compliance with the predetermined content specifications.

2. The method of claim 1 wherein the operation of the tanks is conducted concurrently in unison.

3. The method of claim 1 wherein blended material is discharged by each tank and combined into a single mass of blended material.

4. The method of claim 2 wherein blended material is discharged by each tank and combined into a single mass of blended material.

5. The method of claim 3 wherein blended material is discharged by each tank and combined into a single mass of blended material.

6. An apparatus for sand reblending, comprising, two or more classification tanks with a plurality of stations to receive a raw feed input slurry comprising fluid and a mixture of aggregates of a plurality of mesh sizes, each station having at least a primary product discharge valve and a waste product discharge valve;

means for providing a computer connected to a programmable logic single controller or PLCs (just a switch gear as told by the controller) primary product discharge valve, the waste product discharge valve, and a bed level sensor at each station which must be tripped for the primary product discharge valve and waste discharge valve to be opened;

means for inputting into the computer an initial data set for startup including an initial Station Analysis matrix and initial discharge flow rates;

means for calibrating the tanks and computer for the given location by setting the primary product discharge valve at each station open 100%, delivering the input slurry to the tank, running the tank for a given calibration cycle time, sampling and sieve testing aggregate from the given location to approximate the distribution of mesh sizes contained in the input slurry, sampling and sieve testing aggregate discharged by the tanks at each station respectively, and inputting the test results into the computer so as to develop a mathematical model of the tank including an initial Product A array, a Calibrated Station Analysis Matrix of actual tank performance in terms of individual percent retained for each mesh size at each station, and a matrix of discharge flow rate multipliers that reconciles the input slurry with the sampled aggregate discharged by the tank during calibration;

means for inputting into the computer predetermined content specifications for a primary product including high and low percentages of aggregates capable of passing through a given series of progressively smaller mesh sizes;

means for simulating in the computer that the tanks have been run in a production mode for a given cycle time;

means for comparing the simulated output gradation of the tanks with the predetermined content specifications and identifying any variances therefrom;

means for determining which of the variances are the greatest and which of the mesh sizes is associated therewith;

means for progressively and sequentially searching through each station in the Product A array to identify a marker station that would first reduce said greatest variance if the primary product discharge valve associated with the station were closed a portion of the given cycle time;

means for searching the Calibrated Station Analysis Matrix, beginning at the marker station and continuing through all subsequent stations to find a station having the highest percent retained value for the next smaller mesh size than the mesh size with the greatest variance;

means for simulating setting the primary product discharge valve to be open a lower percentage of the given cycle time at the station having the highest percent retained value from the previous step;

means for calculating a revised Product A Matrix and replacing the raw input feed with a projected resultant gradation output by the tank based upon the previous step;

means for repeating the foregoing simulation and searching steps for any other mesh sizes which exhibit nonzero variance values, so that all variations from the content specifications have been considered and eliminated if possible;

means for establishing target percent open time settings for the primary product discharge valves at each station for a production cycle based upon the above simulations and calculations;

means for running the tanks in a production mode for a production cycle time using the target percent open settings for the valves as determined by the most recent computer simulations and calculations;

means for monitoring and recording the actual open times of the primary product discharge valves allowed by the bed level sensors during the production cycle time and relaying said information to the computer; and means for recalculating the flow discharge rates, the raw feed input, and the variances based upon the actual valve open times recorded.

7. The method of claim 6 wherein means for the operation of the tanks is conducted concurrently in unison.

8. The method of claim 6 wherein means for blended material is discharged by each tank and combined into a single mass of blended material.

9. The method of claim 6 wherein means for blended material is discharged by each tank and combined into a single mass of blended material.

10. The method of claim 6 wherein means for blended material is discharged by each tank and combined into a single mass of blended material.

* * * * *